(12) United States Patent
York et al.

(10) Patent No.: US 11,060,816 B2
(45) Date of Patent: Jul. 13, 2021

(54) DIGITAL TURRET BALLISTIC AIMING SYSTEM

(71) Applicant: Sig Sauer, Inc., Newington, NH (US)

(72) Inventors: Andrew York, Portland, OR (US); Gregory Smith, Sherwood, OR (US); Richard Brumfield, Wilsonville, OR (US); Joseph Fruechtel, Portland, OR (US); Chia-Kan Chang, Taichung (TW)

(73) Assignee: SIG SAUER, INC., Newington, NH (US)

( * ) Notice: Subject to any disclaimer, the term of this patent is extended or adjusted under 35 U.S.C. 154(b) by 0 days.

(21) Appl. No.: 17/008,406

(22) Filed: Aug. 31, 2020

(65) Prior Publication Data

US 2020/0400406 A1 Dec. 24, 2020

Related U.S. Application Data

(62) Division of application No. 16/228,639, filed on Dec. 20, 2018, now Pat. No. 10,767,962.

(60) Provisional application No. 62/608,196, filed on Dec. 20, 2017.

(51) Int. Cl.
*F41G 1/473* (2006.01)
*F41G 1/44* (2006.01)
*F41G 1/38* (2006.01)
*G02B 7/00* (2021.01)

(52) U.S. Cl.
CPC .................. *F41G 1/44* (2013.01); *F41G 1/38* (2013.01); *G02B 7/004* (2013.01)

(58) Field of Classification Search
CPC ........................................................ F41G 1/44
USPC .............................................. 42/119, 122, 126
See application file for complete search history.

(56) References Cited

U.S. PATENT DOCUMENTS

| 6,862,832 B2 | 3/2005 | Barret |
| 7,624,528 B1 | 12/2009 | Bell et al. |
| 7,806,331 B2 | 10/2010 | Windauer et al. |
| 7,905,046 B2 | 3/2011 | Smith, III |
| 8,001,714 B2 | 8/2011 | Davidson |
| 8,051,597 B1 | 11/2011 | D'Souza |
| 8,240,075 B1 | 8/2012 | Mullin |
| 8,336,776 B2 | 12/2012 | Horvath et al. |

(Continued)

FOREIGN PATENT DOCUMENTS

| CN | 201772816 U | 3/2011 |
| CN | 202676028 U | 1/2013 |

(Continued)

*Primary Examiner* — Reginald S Tillman, Jr.
(74) *Attorney, Agent, or Firm* — Miller Nash LLP

(57) ABSTRACT

A method of indicating an aiming adjustment in a riflescope of a shooting device. The method includes receiving, at a controller in the riflescope, a ballistics solution signal, the ballistics solution signal corresponding to a path of a projectile to be fired from the shooting device toward a target; receiving, at the controller, a first electronic signal corresponding to a position of an elevation adjustment selector of the riflescope relative to a zero point of the elevation adjustment selector; determining, by the controller, a magnitude and a direction of an aiming adjustment based on at least the first electronic signal and the ballistics solution signal; and activating an electronic indicator to provide a notification signal to a user, the notification signal conveying the magnitude and the direction of the aiming adjustment.

7 Claims, 9 Drawing Sheets

(56) References Cited

U.S. PATENT DOCUMENTS

| | | |
|---|---|---|
| 8,397,420 B2 | 3/2013 | Hamilton |
| 8,407,927 B2 | 4/2013 | Huber |
| 8,414,298 B2 | 4/2013 | D'Souza et al. |
| 8,479,402 B2 | 7/2013 | Schmitt |
| 8,848,287 B2 | 9/2014 | Schmitt et al. |
| 8,984,796 B2 | 3/2015 | Thomas et al. |
| 9,046,913 B2 | 6/2015 | Crispin |
| 9,057,586 B2 | 6/2015 | Wagner et al. |
| 9,091,507 B2 | 7/2015 | Paterson et al. |
| 9,151,570 B2 | 10/2015 | Plaster |
| 9,182,773 B2 | 11/2015 | Campean |
| 9,188,408 B2 | 11/2015 | Huynh |
| 9,250,035 B2 | 2/2016 | Sullivan et al. |
| 9,297,615 B2 | 3/2016 | Meinert et al. |
| 9,310,165 B2 | 4/2016 | Bell et al. |
| RE46,011 E | 5/2016 | Huber |
| 9,335,120 B2 | 5/2016 | Roman et al. |
| 9,354,438 B2 | 5/2016 | Ingenito et al. |
| 9,423,215 B2 | 8/2016 | White |
| 9,435,609 B2 | 9/2016 | Hamilton |
| 9,518,804 B2 | 12/2016 | Hamilton |
| 9,574,853 B2 | 2/2017 | Crispin |
| 9,958,666 B2 | 5/2018 | Ingenito |
| 2004/0231220 A1 | 11/2004 | McCormick |
| 2005/0213962 A1 | 9/2005 | Gordon |
| 2005/0268521 A1 | 12/2005 | Cox et al. |
| 2007/0234626 A1 | 11/2007 | Murdock |
| 2009/0320348 A1 | 12/2009 | Kelly |
| 2011/0114725 A1 | 5/2011 | Young |
| 2015/0241171 A1 | 8/2015 | Theisinger |
| 2015/0247702 A1 | 9/2015 | Davidson et al. |
| 2015/0316350 A1 | 11/2015 | Hamilton |
| 2016/0040959 A1 | 2/2016 | Davidson et al. |
| 2016/0123704 A1 | 5/2016 | Crispin |
| 2016/0138890 A1 | 5/2016 | Hofmann et al. |
| 2016/0169672 A1 | 6/2016 | Ottl et al. |
| 2016/0178323 A1 | 6/2016 | Ottl |
| 2016/0202021 A1 | 7/2016 | Roman et al. |

FOREIGN PATENT DOCUMENTS

| | | |
|---|---|---|
| CN | 202956027 U | 5/2013 |
| DE | 202005015731 U1 | 1/2006 |
| DE | 102004034267 A1 | 2/2006 |
| DE | 102015104128 A1 | 9/2016 |
| DE | 102011013456 A1 | 10/2017 |
| EP | 0092324 A2 | 10/1983 |
| EP | 0359950 B1 | 5/1994 |
| EP | 0844457 A2 | 5/1998 |
| EP | 1748273 A1 | 1/2007 |
| EP | 1804017 A1 | 7/2007 |
| EP | 1817538 A4 | 5/2011 |
| JP | S5536823 A | 3/1980 |

DIGITAL TURRET BALLISTIC AIMING SYSTEM

CROSS-REFERENCES TO RELATED APPLICATIONS

This patent application is a divisional of application Ser. No. 16/228,639 filed Dec. 20, 2018, which claims the benefit of provisional Application No. 62/608,196 filed Dec. 20, 2017. Application Ser. No. 16/228,639 and 62/608,196 are incorporated into the present disclosure by this reference.

FIELD OF THE INVENTION

The subject matter is related to optical sighting devices, particularly riflescopes.

BACKGROUND

Riflescopes are mounted to rifles to assist in aiming the rifle to hit a desired target. Riflescopes may include reticles, which are markings or other indicators that appear in the field of view over the image of target through the riflescope. Reticles may include horizontal and vertical crosshairs with a central aiming point that can be calibrated to coincide with the point of impact of a selected projectile from the rifle. This central aiming point of the reticle may be zeroed-in at a particular zero range distance and then adjusted for different ranges and conditions using elevation turret and the windage turret to make slight adjustments to its vertical and horizontal position relative to the rifle. In this way, the user may always use the central aiming point of the crosshairs to aim the riflescope, and thus, the rifle.

But keeping track of mechanical adjustments made to these elevation turret and the windage turret takes time, which may be disadvantageous in the field where a desired target could move at any time. Additionally, there are detailed reference charts the user must reference or memorize to correctly adjust these elevation turret and the windage turret. Hence, users in the field may lose track or make errors in adjusting these precision dials, which may result in lost time and mistake.

Embodiments of the disclosed technology address shortcomings in the prior art.

DETAILED DESCRIPTION

As described herein, embodiments provide apparatus and methods to assist a shooter in adjusting the aim of a shooting device having a riflescope. Accordingly, embodiments may include a digital turret, which allows for the revolution or shift of the dial for the elevation turret or the windage turret (or both) to be determined. Accordingly, the position of the dial, relative to, for example, the dial's position at the zeroed-in point, may be determined. In addition, embodiments may display the direction and the magnitude of aiming adjustments to the elevation turret or the windage turret, or both, when shooting conditions require adjustments from the zeroed-in point. In embodiments, such aiming adjustments may be displayed as changes relative to the determined current position of the dial for the elevation turret or the windage turret (or both).

The components of an example system are introduced separately below, before the example system is discussed later in this disclosure.

Figure 1:
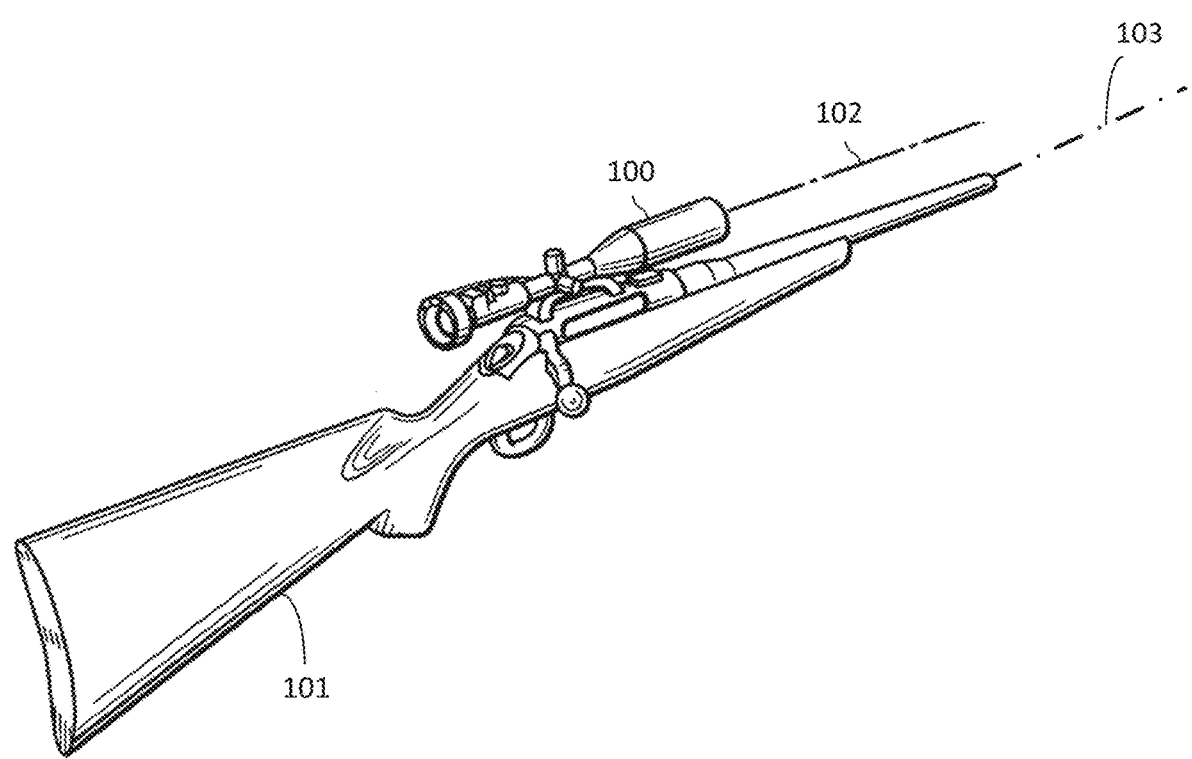
FIG. 1 is a perspective view showing an example of a riflescope mounted to a shooting device.

FIG. 1 is a perspective view showing portions of an example riflescope 100 mounted to a shooting device, depicted as a rifle. Although the discussion here centers on a riflescope 100, the disclosure may be equally applicable to other optical sighting devices. The riflescope 100 has an optical axis 102, sometimes referred to as the z axis. The barrel of the shooting device has a bore line 103.

Figure 2:
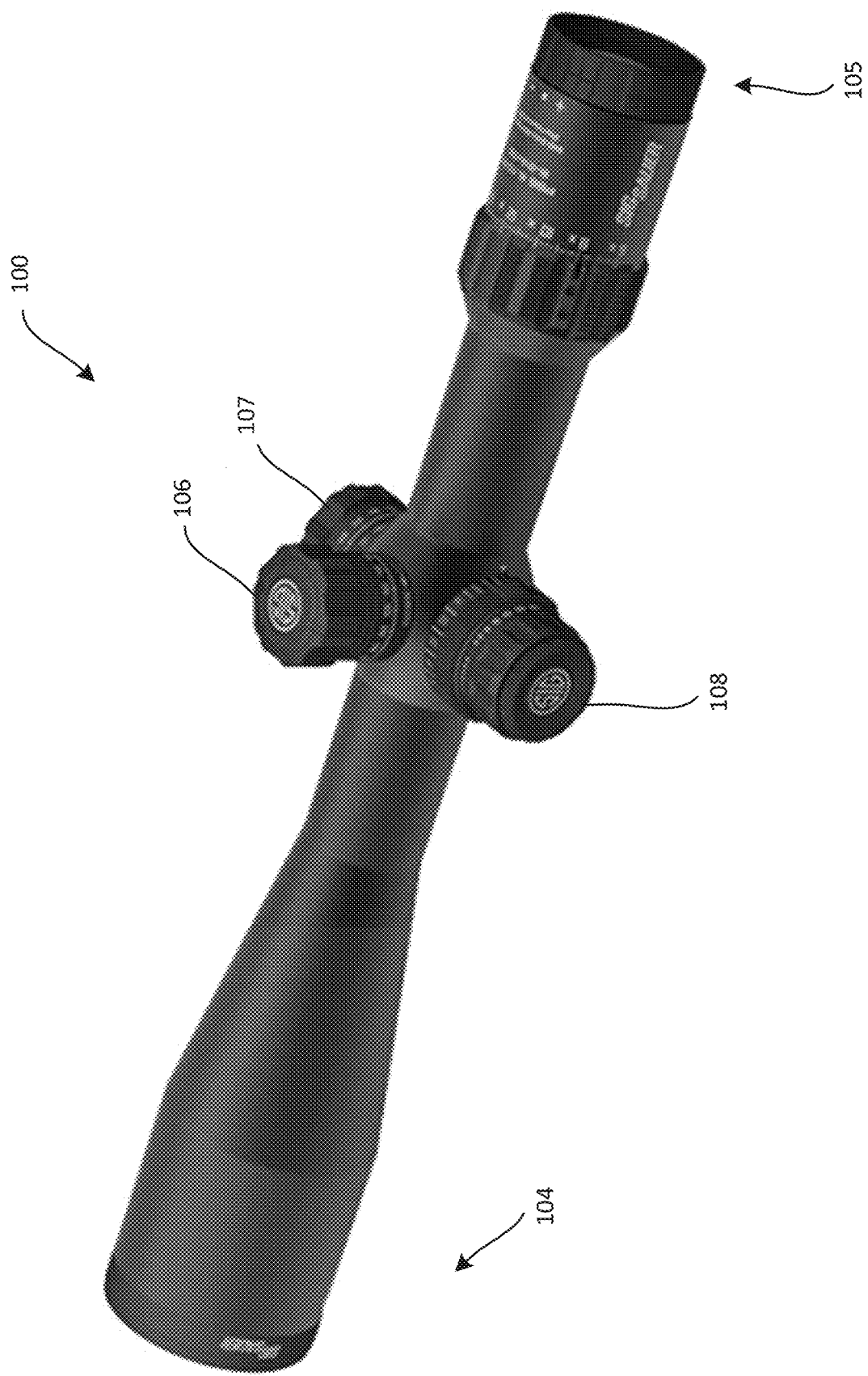
FIG. 2 is a perspective view of an example riflescope, shown in isolation.

FIG. 2 is a perspective view of the riflescope 100 of FIG. 1 shown in isolation. As illustrated in FIG. 2, the riflescope 100 may include an objective end 104, an ocular end 105, an elevation turret 106 (or elevation adjustment selector), a windage turret 107 (or windage adjustment selector), and an auxiliary turret 108. The objective end 104 of the riflescope 100 is typically positioned toward the intended target, while the ocular end 105 is positioned adjacent to the shooter's eye. The elevation turret 106 may be used to adjust the vertical calibration of a reticle 109 (see FIG. 6) within the riflescope 100, and the windage turret 107 may be used to adjust the horizontal calibration of the reticle 109. The auxiliary turret 108 may be used to provide other adjustments or manipulations to the riflescope 100, such as, for example, a parallax compensation adjustment or an illumination brightness control for an illuminated reticle 109. The auxiliary turret 108 may also house other components as discussed for FIG. 3 below.

Figure 3:
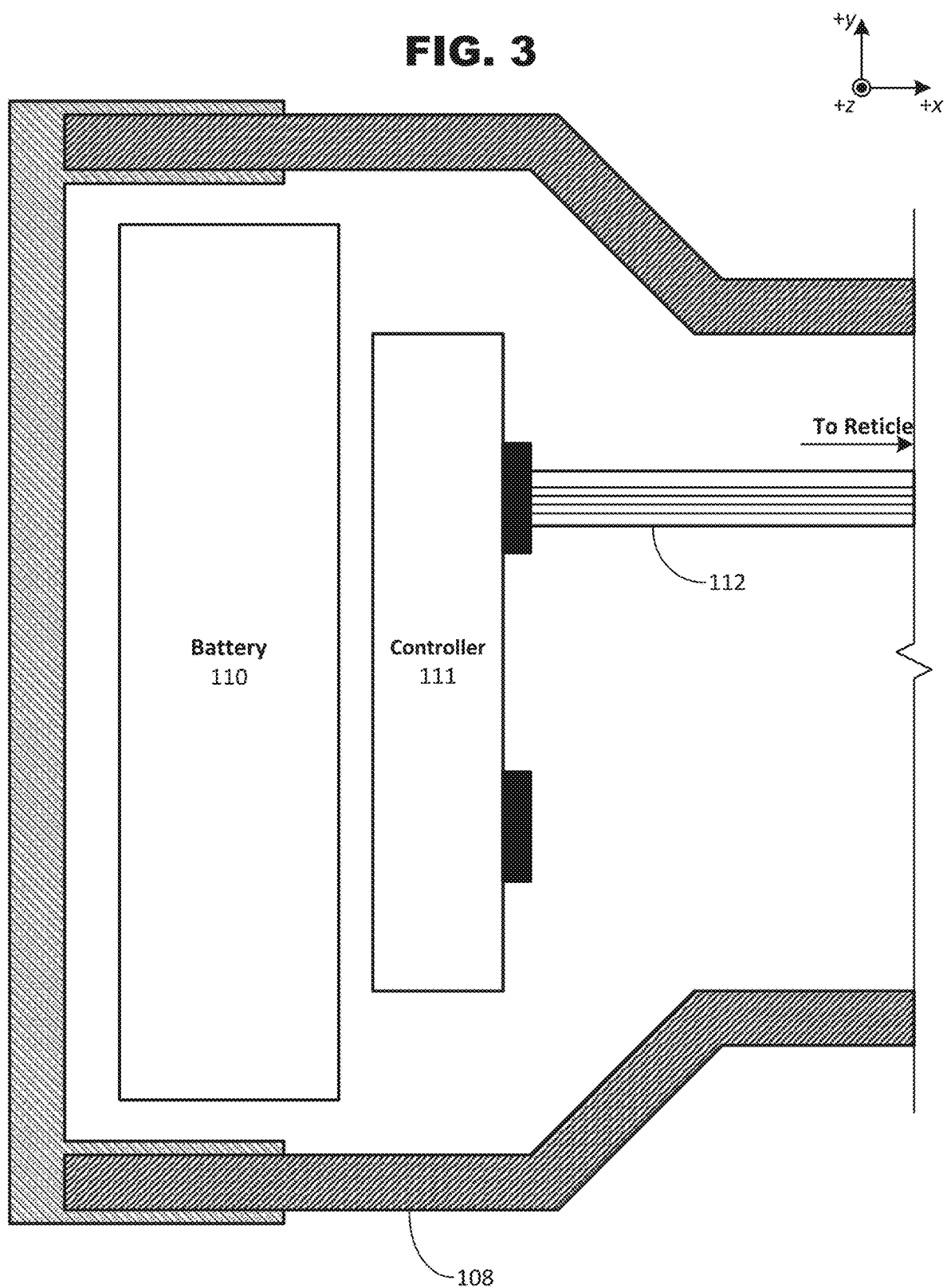
FIG. 3 diagrammatically illustrates selected components that may be included within an auxiliary turret of the riflescope.

FIG. 3 diagrammatically illustrates selected components that may be included inside an auxiliary turret 108. As illustrated in FIG. 3, the auxiliary turret 108 may include a battery 110 and a controller 111. For clarity, FIG. 3 does not show circuits or other electronics that connect the battery 110 to the controller 111, the battery 110 to other components, or the controller 111 to other components, except as discussed here. The battery 110 may be a power source for the controller 111 and for other components of the riflescope 100. In embodiments, the controller 111 may be connected to the reticle 109 (for example, through a flexible circuit 112). Hence, the controller 111 may enable and control operation of the reticle 109.

Figure 4:
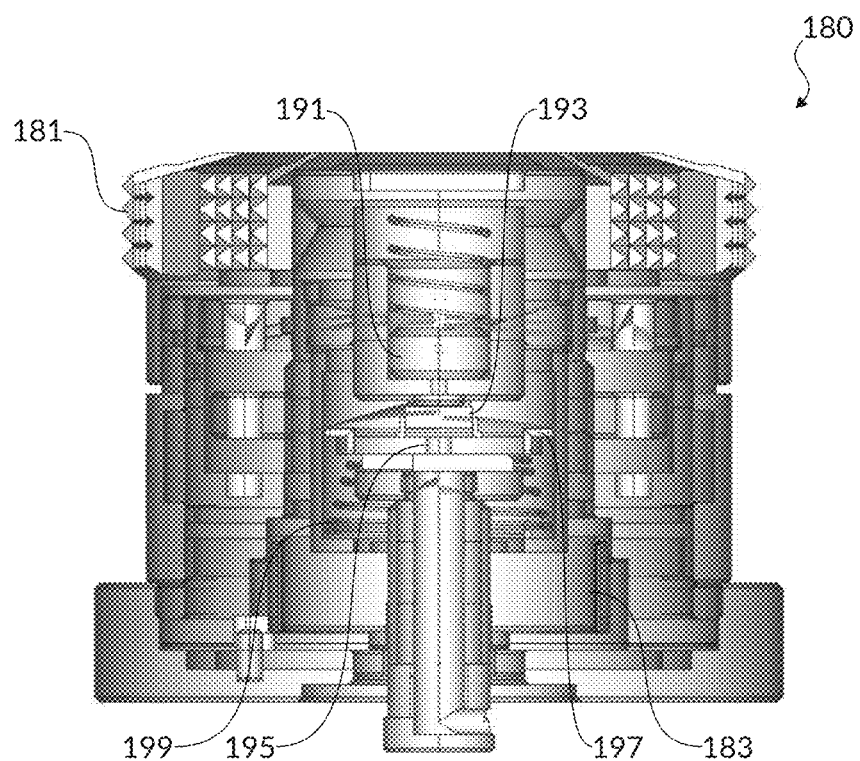
FIG. 4 is a partial cutaway of an example digital turret for a riflescope.

In embodiments, the elevation turret 106 or the windage turret 107, or both may be a digital turret 180, an example of which is illustrated in FIG. 4. In contrast to conventional mechanical turrets, the digital turret 180 may include both mechanical and electro-mechanical components. For example, the digital turret 180 may utilize linear encoders or rotational encoders, or both, to determine the position of the dial 181, or selector. Additionally, the digital turret 180 may allow for the revolution or shift of the dial 181 to be calculated using a magnet 191 and a magnetic rotary position sensor 193. The magnetic rotary position sensor 193 may be, for example, the AS5600 Position Sensor manufactured by ams AG.

Each digital turret 180 may output a signal regarding the sensed rotative position or shift of the dial 181. This data from the digital turrets 180 may be transmitted to a processor within the riflescope 100, such as the controller 111, or communicated to the rangefinder 114 or the mobile device 115 (see FIG. 5). A controller, such as the controller 111 may be configured to determine, based on at least the signal from the digital turret 180 and the ballistics solution, the magnitude and the direction of the aiming adjustment corresponding to the ballistics solution signal. This is discussed in more detail below.

The digital turret 180 may be configured to provide audible or tactile feedback, such as clicks that may be felt or heard, or both, when the user adjusts the dial 181. For example, each click may correspond to a preset amount of rotative displacement of the dial 181. Hence, for example, the user may sense a click for every five degrees that the dial 181 is rotated. Other intervals may also be used.

The digital turret 180 may include an adjustable zero-stop pin or screw that interacts with, for example, a reset plate to cause a hard stop of the dial 181 at the zero point. This zero point may be set or reset by the user during the zeroing-in process. To allow for multiple revolutions, the dial 181 may be formed with a cam such that the zero-stop pin moves to avoid the hard stop in the reset plate when the dial 181 is rotated in the counter-clockwise direction more than 360 degrees from the zero point. Additionally, since the magnetic rotary position sensor 193 may not record a revolution or shift when the digital turret 180 is unpowered, a non-linear resistor 195 may be provided within the digital turret 180 to track the revolution or shift of the dial 181 using an absolute position sensor.

As shown in FIG. 4, rotating the dial 181 will cause the bushing 183, with a spring coil 199 biasing upward, to simultaneously rotate in the same direction as the dial 181. The rotation of the bushing 183 may cause the central screw post and the rotatable coil 197 to rise upward (from the point of view illustrated in the figure). The non-linear resistor 195 may be fixed to the inside diameter of the bushing 183 and in contact with the rotatable coil 197. The interaction between the non-linear resistor 195 and the rotatable coil 197 allows the revolution of the dial 181 (through, for example, its height) to be tracked even if changes are made when the power is off, because upon powering on, the absolute position of the non-linear resistor 195 relative to its contact point with the rotatable coil 197 can be sensed.

Figure 5:
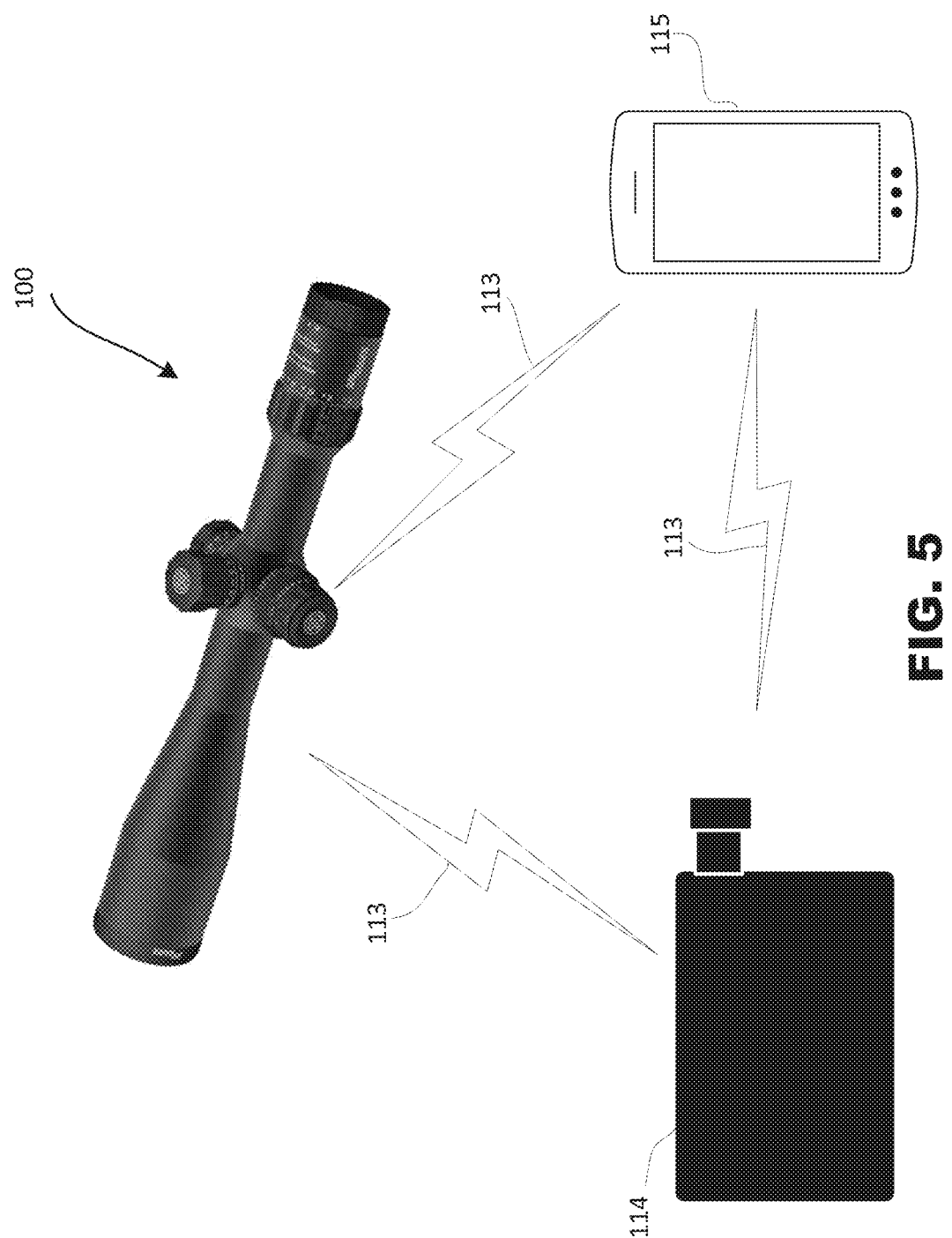
FIG. 5 illustrates an example riflescope having a wireless connection with an example rangefinder and an example mobile device.

FIG. 5 illustrates an example riflescope wo having a wireless connection 113 with an example rangefinder 114 and an example mobile device 115 running a mobile application. In some embodiments, the wireless connection 113 may instead be a wired connection. The interconnection of the riflescope 100, the rangefinder 114, and the mobile device 115 are described more fully elsewhere in this disclosure.

Figure 6:
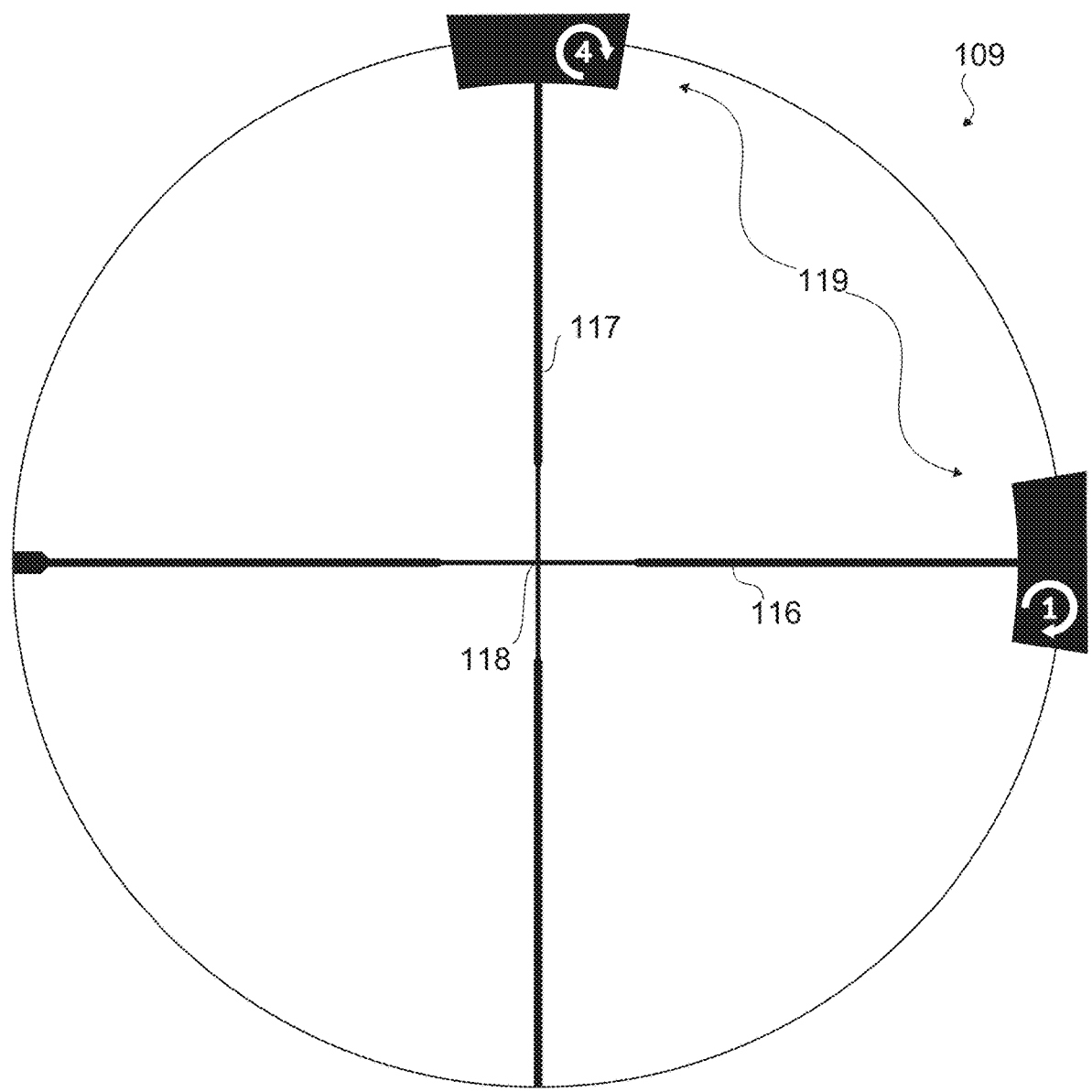
FIG. 6 is an example reticle, including aim-adjustment indicators, within the field of view of a riflescope.

FIG. 6 diagrammatically illustrates an example of a reticle 109 that may be used with embodiments of the disclosed technology. The reticle 109 is shown as it may appear when the shooter looks through the ocular end 105 of the riflescope 100. As illustrated in FIG. 6, the reticle 109 may include a horizontal crosshair 116 and a vertical crosshair 117. The intersection of the horizontal crosshair 116 and the vertical crosshair 117 forms a central aiming point 118, which coincides with the optical axis 102 of the riflescope 100.

The reticle 109 may be a mechanical reticle 109 provided within or on a reticle 109 lens, plano-convex glass, or electro-formed wire. Additionally or alternatively to the mechanical reticle 109, the riflescope 100 may have a projected or digital reticle 109 that appears in the field of view of the riflescope 100.

A ballistic trajectory is a parabolic curve that begins its initial ascent at the angle of the rifle bore line 103. Due to gravitational forces, the projectile may undergo a certain amount of vertical bullet drop relative to the rifle bore line 103 along the path of the projectile. The ballistic trajectory for the projectile may also vary with environmental conditions, such as crosswind, pressure, temperature, density altitude, humidity, and angle of incline as well as with the projectile's characteristics, such as caliber, bullet weight, ballistic coefficient, and muzzle velocity.

Through a zeroing-in process, the optical axis 102 of the riflescope 100 may be locked into a position relative to the bore line 103 of the rifle 101. Zeroing-in typically includes shooting a fixed target from a known range (for example, 100 yards) and adjusting the position of the riflescope 100 or the reticle 109 within the riflescope 100 (or both) relative to the rifle bore line 103 until the central aiming point 118 of the reticle 109 within the riflescope 100 appears to the shooter to coincide with the actual point of impact on the target. These adjustments to the reticle position may be made in both the horizontal and vertical directions, using adjustment dials on the windage turret 107 and the elevation turret 106, respectively, resulting in a zeroed-in point (or zero point) of the riflescope 100.

But for targets at ranges and under environmental conditions that are different from the zeroed-in range and conditions, the shooter may need to compensate for the different range and conditions by, for example, utilizing an electronic ballistics calculator.

That is, for given range, environmental conditions, selected projectile, and other user input information, the electronic ballistics calculator may compute or otherwise provide a new ballistic solution for the selected projectile. The electronic ballistics calculator may, for example, use stored G1, G7, or other drag curves, empirically measured data tables, or algorithms for the selected projectile to calculate the amount of vertical bullet drop at any range. The amount of vertical bullet drop may be used to determine an elevation correction—the amount that the riflescope 100 should be raised to compensate for the vertical bullet drop. The ballistic solution may include a windage correction— the amount that the riflescope 100 should be moved left or right—to compensate for any component of the wind that is perpendicular to the intended path of the projectile.

The electronic ballistics calculator may be, for example, a module of a controller within the riflescope 100, such as the controller 111 of FIG. 3. In embodiments, the electronic ballistics calculator may be external to the riflescope 100. For example, the mobile application running on the mobile device 115 may include the electronic ballistics calculator as a module. As another example, the digital rangefinder 114 may include the electronic ballistics calculator.

The range to the target may be determined by, for example, the rangefinder 114. The rangefinder 114 may be integrated with the riflescope 100, or the rangefinder 114 may be external to the riflescope 100, such as shown in FIG. 5. The rangefinder 114 may be, for example, a laser rangefinder 114, such as the KILO1400BDX rangefinder 114 provided by Sig Sauer Inc. or another electronic rangefinder 114 configured to transmit range values determined by the rangefinder 114. The rangefinder 114 may provide the range measurement through a wired connection or wirelessly, such as through a connection using the BLUETOOTH® wireless technology standard from Bluetooth SIG, Inc. or another radio-frequency (RF) wireless technology. The connection may be to the riflescope 100, to the mobile device 115, or to both. (See FIG. 5.)

The riflescope 100 may receive a ballistics solution from the rangefinder 114 or the mobile device 115 running the ballistics solution app. The ballistics solution may include an aiming adjustment in the form of, for example minutes of angle (MOA), milliradian (mil or MRAD), or Bullet Drop Compensation (BDC), for adjusting the central aiming point 118 intersection vertically using the elevation turret 106, to compensate for gravitational bullet drop, for example. The ballistics solution may also include an aiming adjustment for adjusting the central aiming point 118 intersection horizontally using the windage turret 107, such as for wind correction.

As noted above, a controller, such as the controller 111 may be configured to determine the magnitude and the direction of an aiming adjustment corresponding to the ballistics solution. The determination may be made, for example, based on at least and the ballistics solution and a signal from the digital turret 180 corresponding to the sensed rotative position or shift of the dial 181 of the digital turret 180.

For example, the digital turret 180 senses where the dial 181 is and communicates that positional information to the controller 111 in the form of an electrical signal. Based on the ballistics solution, the controller 111 "knows" or determines where the dial 181 of the digital 180 should be to properly strike the intended target with the projectile. This determination may be based on, for example, an elevation correction or a windage correction (or both) from the electronic ballistics calculator. The controller 111 may then determine how much and in what direction the dial 181 should be adjusted to correspond to the ballistics solution. This determination (of how much and in what direction the dial 181 should be adjusted) may be displayed for the user as discussed in more detail below. The controller 111 may continuously update this determination (and the corresponding display of the determination) as, for example, the user adjusts the dial 181. This may provide the user with continuous feedback during the adjustment process, allowing the user to quickly and accurately make the proper adjustments to the dial 181.

Returning to the example reticle 109 of FIG. 6, the figure illustrates example aim-adjustment indicators 119 along the edge of the field of view of the riflescope 100. The aim-adjustment indicators 119 may be categorized as horizontal adjustment indicators 120 and vertical adjustment indicators 121. The horizontal, or windage, adjustment indicators 120 may be located at the end of the horizontal crosshair 116 of the reticle 109 and may be displayed to provide the corresponding horizontal aiming adjustment of the ballistics solution to compensate for, for example, crosswind. The vertical, or elevation, adjustment indicators 121 may be located at the end of the vertical crosshair 117 of the reticle 109 and may be displayed to provide the corresponding vertical aiming adjustment of the ballistics solution to compensate for, for example, bullet drop.

The aim-adjustment indicators 119 may include addressable LEDs that are selectively lit or unlit by a processor within the riflescope 100. For example, the aim-adjustment indicators 119 may include individually addressable LEDs located along the periphery of the field of view within designated areas associated with each of the elevation turret 106 and the windage turret 107, respectively, such as adjacent the ends of the horizontal crosshair 116 and vertical crosshair 117 of the mechanical reticle 109. The LEDs may be arranged within a clear substrate. The LEDs may be connected to power and the processor through leads for selective illumination by the riflescope 100. The LEDs may be arranged on or adjacent the containing structure of the mechanical reticle 109, which may be located in the first or second focal plane, for example, near the objective or ocular lens of the riflescope 100. The riflescope 100 may light LEDs corresponding to a ballistics solution. Additionally or alternatively, the mechanical reticle 109 may be located in a different focal plane than some or all of the LEDs.

The aim-adjustment indicators 119, may display the exact number of "clicks" still needed on the elevation or windage adjustment turrets based on the determined ballistics solution and the current elevation or windage turret 107 dial positions. Additionally or alternatively, the aim-adjustment indicators 119 may appear as a symbol indicating the need to continue to adjust the elevation or windage adjustment turrets. The aim-adjustment indicators 119 may then disappear (for example, be unlit) when the full adjustments have been made. If the user overshoots the recommended adjustments to the windage or elevation adjustment turrets, the aim-adjustment indicators 119 may reappear and indicate that changes to the elevation or windage adjustment turrets should be made in the reverse direction.

Figure 7A:
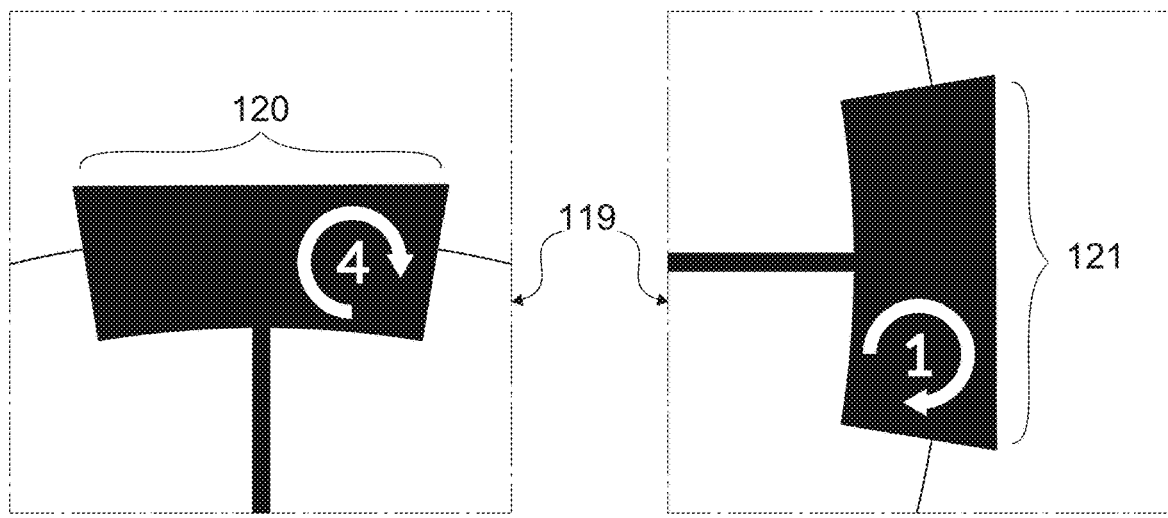
FIG. 7A illustrates an example of an aim-adjustment indicator on the vertical crosshair of a reticle (left view) and an example of an aim-adjustment indicator on the horizontal crosshair of a reticle (right view), according to embodiments.

FIG. 7A shows a close-up view of the aim-adjustment indicators 119 along the peripheries of the riflescope's field of view from FIG. 6. The lit LEDs provide the suggested aiming adjustments for the user based on the determined ballistics solution. An aiming adjustment indicates to the user how far along the horizontal and vertical directions to shift the central aiming point 118 using the elevation turret 106 and the windage turret 107 to hit the desired point of impact on the target when viewed along the optical line of sight of the riflescope 100. The aiming adjustments may be illuminated for neither, either, or both the elevation turret 106 and the windage turret 107 using the aim-adjustment indicators 119, depending on the ballistics solution and the physical adjustments that the user makes to the elevation turret 106 and the windage turret 107.

As shown in FIG. 7A, the illuminated vertical adjustment indicators 121 at the end of the vertical crosshair 117 indicate the number of clicks and the direction that the user should turn the elevation turret 106. Similarly, the illuminated horizontal adjustment indicators 120 at the end of the horizontal crosshair 116 indicate the number of clicks and the direction that the user should turn the windage turret 107. Hence, with reference to the example of FIG. 7A, the vertical adjustment indicators 121 display for the user that the elevation adjustment dial should be turned four clicks clockwise and that the windage adjustment dial should be turned one click clockwise.

The position of the vertical adjustment indicators 121 at the end of the vertical crosshair 117 correlate with the position of the elevation turret 106 at the top of the riflescope 100. Likewise, the position of the horizontal adjustment indicators 120 at the end of the horizontal crosshair 116 correlate with the position of the windage turret 107 along the right side of the riflescope 100 as the user is looking through the ocular lens toward the objective lens.

Figure 7B:
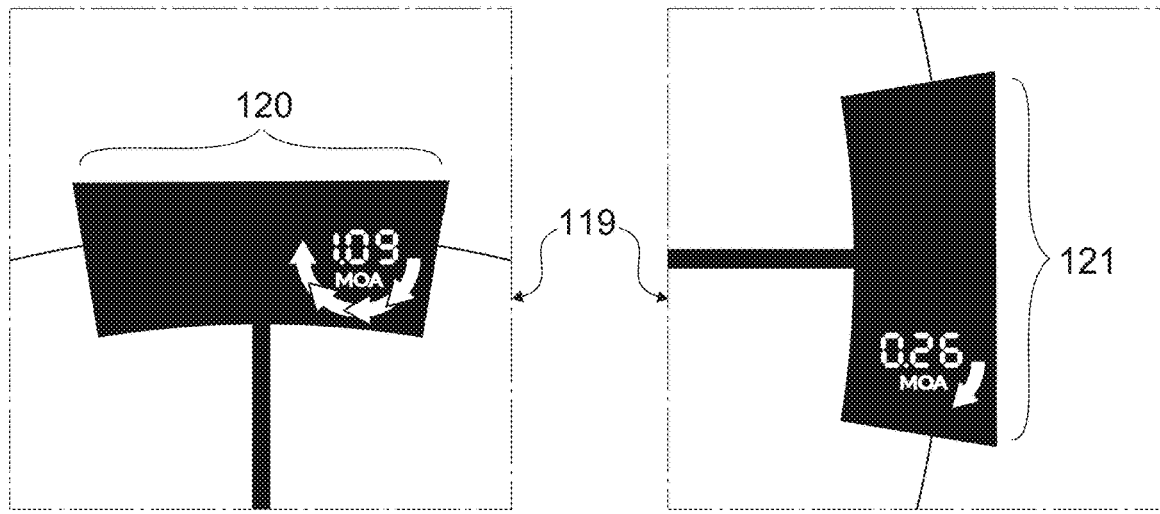
FIG. 7B illustrates an example of an aim-adjustment indicator on the vertical crosshair of a reticle (left view) and an example of an aim-adjustment indicator on the horizontal crosshair of a reticle (right view), according to embodiments.

Like FIG. 7A, FIG. 7B shows the vertical adjustment indicators 121 at the end of the vertical crosshair 117 and the horizontal adjustment indicators 120 at the end of the horizontal crosshair 116, corresponding to the respective positions of the elevation turret 106 and the windage turret 107 on the riflescope 100. In contrast with FIG. 7A, the aim-adjustment indicators 119 of FIG. 7B show the adjustments to be made based on the ballistics solution in terms of MOA, rather than number of clicks. Additionally, the aim-adjustment indicators 119 of FIG. 7B provide a visual indication of the proper rotation direction using graphics.

Figure 7C:
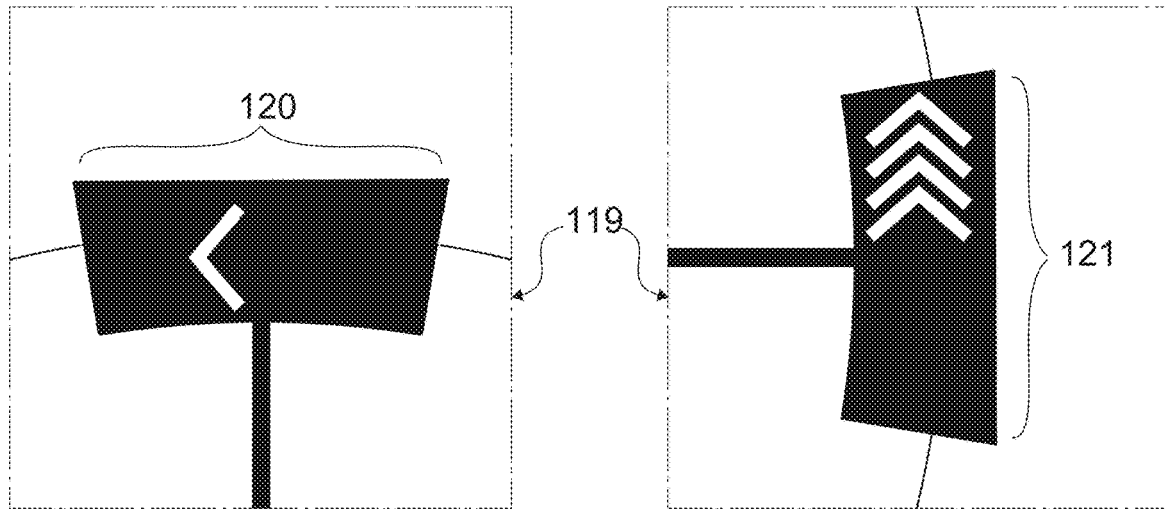
FIG. 7C illustrates an example of an aim-adjustment indicator on the vertical crosshair of a reticle (left view) and an example of an aim-adjustment indicator on the horizontal crosshair of a reticle (right view), according to embodiments.

In contrast with FIGS. 7A-B, the aim-adjustment indicators 119 of FIG. 7C are oriented such that the vertical adjustment indicators 121 are at the end of the horizontal crosshair 116 and the horizontal adjustment indicators 120 are at the end of the vertical crosshair 117. In this way, the aim-adjustment indicators 119 may show the relative direction that the changes to the elevation turret 106 and the windage turret 107 will be adjusting the mechanical reticle 109. Thus, even without adjusting the elevation turret 106 and the windage turret 107, the shooter may have a clearer understanding of how far vertically and horizontally the point of aim needs to be adjusted since the appropriate aim-adjustment indicators 119 correspond with their respective reticle 109 quadrants. The aim-adjustment indicators 119 of FIG. 7C, illustrated as chevrons, further indicate the degree of change needed in the elevation turret 106 and the windage turret 107 via analog graphics rather than a precise number, so that the user need only keep adjusting the elevation turret 106 and the windage turret 107 until the aim-adjustment indicators 119 indicate the proper changes have been made, without having to think of precise numbers or calculations.

Additionally or alternatively, the aim-adjustment indicators 119 may appear in the field of view around the entire periphery, with selective illumination corresponding to the amount or direction of changes to be made to either or both of the elevation turret 106 and the windage turret 107. These periphery-surrounding aim-adjustment indicators 119 may be a series of individually addressable LEDs or a continuous circular display wrapping around the field of view, for example. Different colors could correspond with different adjustment turrets, and the amount or number of times the periphery-surrounding aim-adjustment indicators 119 appear to wrap around the field of view may correspond with the suggested rotational adjustment to make to the respective adjustment turret based on the ballistics solution. The aim-adjustment indicators 119 may be transparent or transmissive OLEDs embedded over the riflescope 100's field of view and only visible when illuminated. Additionally or alternatively, the aim-adjustment indicators 119 may be non-transmissive OLEDs appearing over the sides or obscured portions of the riflescope's field of view. The aim-adjustment indicators 119 may be illuminated by any other known means, including projections, reflections, beam-splitting, scintillation, diffusers, light guides, lasers, and fiber optics, for example.

Hence, rather than the user having to calculate adjustments away from the set zeroed-in position for the elevation adjustment turret and the windage adjustment turret, aim-adjustment indicators 119 may be displayed to prompt the user to make adjustments to the angle and position of the rifle bore line 103, which results in corresponding changes to the initial line of fire of the selected projectile.

Figure 8:
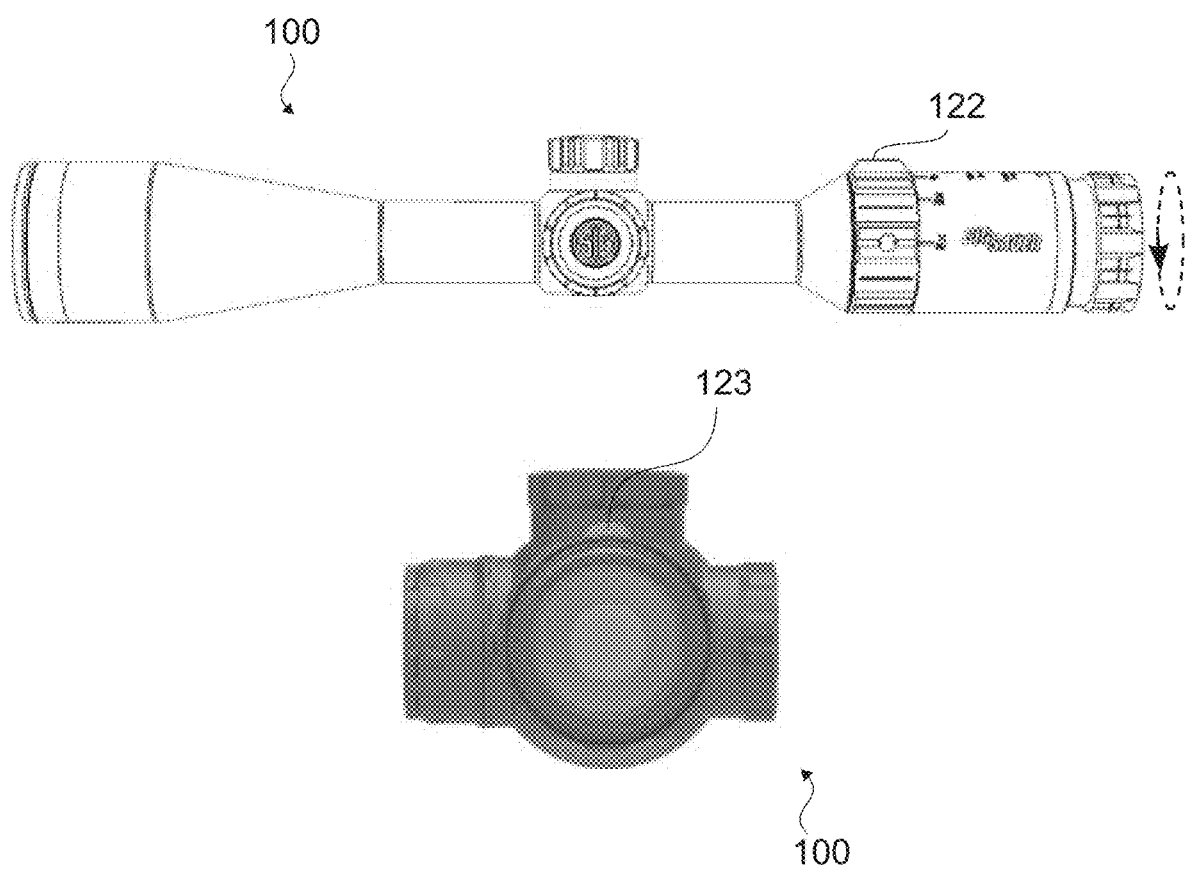
FIG. 8 shows an example riflescope with a power selector ring.

As shown in FIG. 8, embodiments of the riflescope 100 may include a power selector ring 122 for altering the magnification power level of the riflescope 100. The greater the magnification power level the larger the image of the target within the field of view will appear. The power selector ring 122 may include an encoder, a zoom sensor, or other method of determining the selected magnification power level for the riflescope 100 at any given time. The encoder may send a magnification signal to a controller within the riflescope 100, such as the controller 111. The magnification signal may include data about the selected or last magnification power level of the riflescope 100 or power selector ring 122.

The power selector ring 122 or the elevation turret 106 and the windage turret 107 may include an LED or other indicator 123 that is oriented to illuminate in the direction of the user, as shown in FIG. 8. The LED indicator 123 may illuminate when the riflescope 100 is wirelessly paired with the rangefinder 114 or device running the ballistics solution app over Bluetooth or other communications means. Additionally, the LED indicator 123 may flash for various counts, set times, or frequencies to indicate different states to the user. Additionally or alternatively, the LED indicator 123 may change colors to indicate different states to the user. For example, the LED indicator 123 may flash at a slower frequency when the user is configuring the riflescope 100 through the ballistics solution app running on a paired device. As another non-limiting example, the LED indicator 123 may flash five times at a more rapid frequency and then remain constantly on for five seconds to indicate to the user that a target is being ranged using a paired rangefinder 114 and a new ballistics solution has been received by the riflescope 100. The LED indicator 123 may have its brightness, color, or power controlled or set by the user through controls on the riflescope 100 or configuration settings within the ballistics solution app. Additionally or alternatively, the LED indicator 123 may be located elsewhere on the riflescope 100, such as on the diopter adjustment ring or within the field of view through the ocular lens, for example. In this way, the LED indicator 123 advantageously signals to the user that the riflescope 100 is ready to be used with the latest ballistics solution without the user having to move out of shooting posture.

Figure 9:
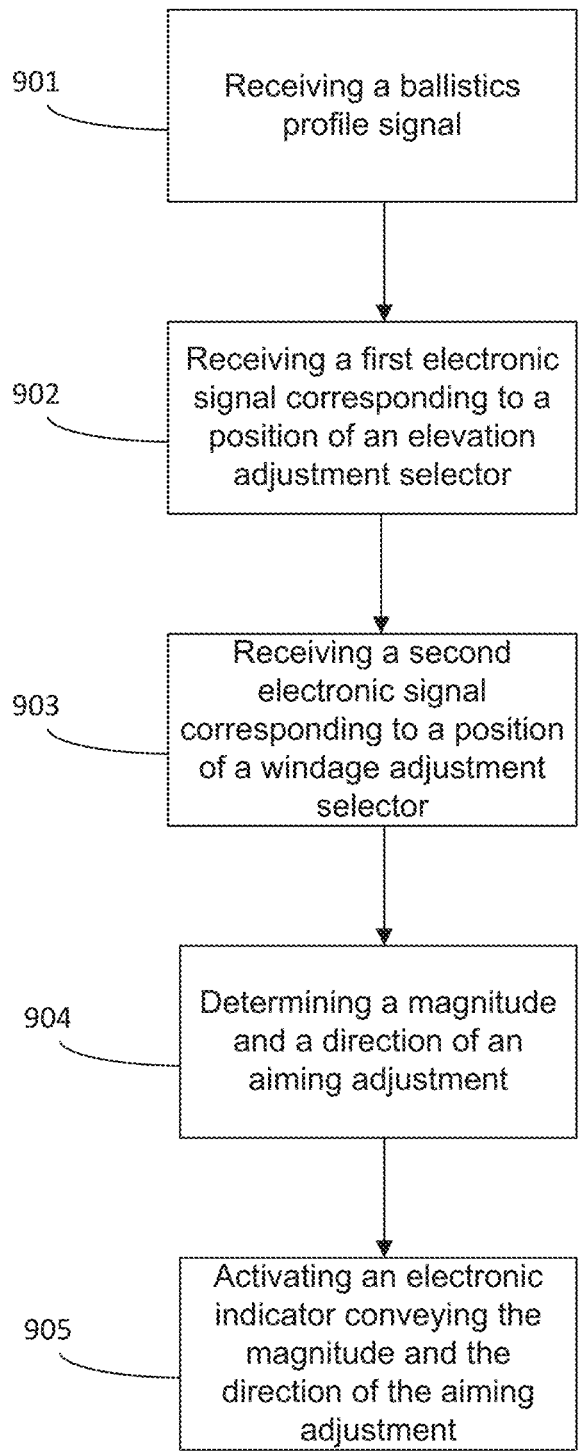
FIG. 9 illustrates an example method, according to embodiments.

FIG. 9 illustrates an example method according to embodiments of the disclosed technology. Accordingly, in use a method 900 of indicating an aiming adjustment in a riflescope of a shooting device may include: receiving 901, at a controller in the riflescope, a ballistics solution signal, the ballistics solution signal corresponding to a path of a projectile to be fired from the shooting device toward a target; receiving 902, at the controller, a first electronic signal corresponding to a position of an elevation adjustment selector of the riflescope relative to a zero point of the elevation adjustment selector; determining 904, by the controller, a magnitude and a direction of an aiming adjustment based on at least the first electronic signal and the ballistics solution signal; and activating 905 an electronic indicator to provide a notification signal to a user, the notification signal conveying the magnitude and the direction of the aiming adjustment.

In embodiments, activating the electronic indicator to provide the notification signal to the user includes activating a visual element in a reticle of the riflescope. In embodiments, activating the visual element in the reticle of the riflescope includes: activating a numerical element, indicating the magnitude of the aiming adjustment; and activating a pictographic element, indicating the direction of the aiming adjustment.

In embodiments, the method may also include receiving 903, at the controller, a second electronic signal corresponding to a position of a windage adjustment selector of the riflescope relative to a zero point of the windage adjustment selector, in which determining the magnitude and the direction of the aiming adjustment is based on at least the first electronic signal, the second electronic signal, and the ballistics solution signal.

EXAMPLES

Illustrative examples of the disclosed technologies are provided below. An embodiment of the technologies may include one or more, and any combination of, the examples described below.

Example 1 includes a digital turret comprising an adjustment selector configured to adjust a main optical axis of a riflescope relative to a bore line of a shooting device, the digital turret configured to determine a position of the adjustment selector relative to a zero point of the adjustment selector, the digital turret further configured to transmit an electronic signal corresponding to the position of the adjustment selector.

Example 2 includes the digital turret of Example 1, in which the adjustment selector comprises an elevation adjustment selector configured to vertically adjust the main optical axis of the riflescope.

Example 3 includes the digital turret of any of Examples 1-2, in which the adjustment selector comprises a windage adjustment selector configured to horizontally adjust the main optical axis of the riflescope.

Example 4 includes an optical sighting system comprising: a riflescope having a main optical axis extending from an ocular end to an objective end of the riflescope, the main optical axis being configured to be fixedly aligned with a bore line of a shooting device, and an electronic aim-adjustment indicator structured to provide a notification signal to a user; and an electronic ballistics calculator running on an electronic device external to the riflescope, the electronic device configured to transmit a ballistics solution signal corresponding to a ballistics solution of a projectile to be fired from the shooting device toward a target, the riflescope configured to receive the ballistics solution signal and to activate the electronic aim-adjustment indicator to provide the notification signal, the notification signal configured to convey a magnitude and a direction of an aiming adjustment corresponding to the ballistics solution signal.

Example 5 includes the optical sighting system of Example 4, further comprising a digital turret, the digital turret comprising an adjustment dial configured to adjust the main optical axis of the riflescope relative to the bore line of the shooting device, the digital turret configured to transmit an electronic signal corresponding to a rotative position of the adjustment dial relative to a zero point of the adjustment dial.

Example 6 includes the optical sighting system of any of Examples 4-5, further comprising a controller configured to receive the electronic signal corresponding to the rotative position of the adjustment dial and to receive the ballistics solution signal, the controller further configured to determine, based on at least the electronic signal corresponding to the rotative position of the adjustment dial and the ballistics solution signal, the magnitude and the direction of the aiming adjustment corresponding to the ballistics solution signal.

Example 7 includes the optical sighting system of any of Examples 4, further comprising a digital turret, the digital turret comprising: an elevation adjustment dial configured to vertically adjust the main optical axis of the riflescope, in which the digital turret is configured to transmit an electronic signal corresponding to a rotative position of the elevation adjustment dial relative to a zero point of the elevation adjustment dial; and a windage adjustment dial configured to horizontally adjust the main optical axis of the riflescope, in which the digital turret is configured to transmit an electronic signal corresponding to a rotative position of the windage adjustment dial relative to a zero point of the windage adjustment dial.

Example 8 includes the optical sighting system of any of Examples 4-7, in which the electronic aim-adjustment indicator comprises a visual element in a reticle of the riflescope.

Example 9 includes the optical sighting system of Example 8, in which the visual element in the reticle comprises a numerical element configured to numerically indicate the magnitude of the aiming adjustment, and the graphical element.

Example 10 includes the optical sighting system of any of Examples 8-9, in which the visual element in the reticle comprises a graphical element configured to display an indicator of the direction of the aiming adjustment.

Example 11 includes the optical sighting system of Example 8, in which the visual element in the reticle comprises first aim-adjustment indicia on a vertical crosshair of the reticle and second aim-adjustment indicia on a horizontal crosshair of the reticle.

Example 12 includes the optical sighting system of Example 11, in which the first aim-adjustment indicia on the vertical crosshair numerically indicates a number of clicks of an elevation adjustment dial of the riflescope to implement a vertical component of the aiming adjustment, each click corresponding to a preset amount of rotative displacement of the elevation adjustment dial, and in which the first aim-adjustment indicia on the vertical crosshair also includes an indicator of a rotative direction to turn the elevation adjustment dial of the riflescope to implement the vertical component of the aiming adjustment.

Example 13 includes the optical sighting system of any of Examples 11-12, in which the second aim-adjustment indicia on the horizontal crosshair numerically indicates a number of clicks of a windage adjustment dial of the riflescope to implement a horizontal component of the aiming adjustment, each click corresponding to a preset amount of rotative displacement of the windage adjustment dial, and in which the second aim-adjustment indicia on the horizontal crosshair also includes an indicator of a rotative direction to turn the windage adjustment dial of the riflescope to implement the horizontal component of the aiming adjustment.

Example 14 includes the optical sighting system of Example 11, in which the first aim-adjustment indicia on the vertical crosshair numerically displays an angular correction to implement a vertical component of the aiming adjustment, and in which the first aim-adjustment indicia on the vertical crosshair also includes an indicator of a rotative direction to turn the elevation adjustment dial of the riflescope to implement the vertical component of the aiming adjustment.

Example 15 includes the optical sighting system of any of Examples 11 or 14, in which the second aim-adjustment indicia on the horizontal crosshair numerically displays an angular correction to implement a horizontal component of the aiming adjustment, and in which the second aim-adjustment indicia on the horizontal crosshair also includes an indicator of a rotative direction to turn the windage adjustment dial of the riflescope to implement the horizontal component of the aiming adjustment.

Example 16 includes the optical sighting system of Example 8, in which the visual element comprises one or more chevrons in a quantity of chevrons, the quantity of chevrons configured to numerically indicate the magnitude of the aiming adjustment, and the one or more chevrons pointing in a first direction configured to pictographically indicate the direction of the aiming adjustment.

Example 17 includes a method of indicating an aiming adjustment in a riflescope of a shooting device, the method comprising: receiving, at a controller in the riflescope, a ballistics solution signal, the ballistics solution signal corresponding to a path of a projectile to be fired from the shooting device toward a target; receiving, at the controller, a first electronic signal corresponding to a position of an elevation adjustment selector of the riflescope relative to a zero point of the elevation adjustment selector; determining, by the controller, a magnitude and a direction of an aiming adjustment based on at least the first electronic signal and the ballistics solution signal; and activating an electronic indicator to provide a notification signal to a user, the notification signal conveying the magnitude and the direction of the aiming adjustment.

Example 18 includes the method of Example 17, in which activating the electronic indicator to provide the notification signal to the user comprises activating a visual element in a reticle of the riflescope.

Example 19 includes the method of Example 18, in which activating the visual element in the reticle of the riflescope comprises: activating a numerical element, indicating the magnitude of the aiming adjustment; and activating a pictographic element, indicating the direction of the aiming adjustment.

Example 20 includes the method of any of Examples 17-19, further comprising receiving, at the controller, a second electronic signal corresponding to a position of a windage adjustment selector of the riflescope relative to a zero point of the windage adjustment selector, in which determining the magnitude and the direction of the aiming adjustment is based on at least the first electronic signal, the second electronic signal, and the ballistics solution signal.

Embodiments may operate on a particularly created hardware, on firmware, digital signal processors, or on a specially programmed general purpose computer including a processor operating according to programmed instructions. The terms "controller" or "processor" as used herein are intended to include microprocessors, microcomputers, ASICs, and dedicated hardware controllers. One or more aspects may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosed systems and methods, and such data structures are contemplated within the scope of computer executable instructions and computer-usable data described herein.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "vertical," "horizontal," "right," "left," "upward," and "downward" are used for convenience and in reference to the views provided in figures. But the riflescope may have a number of orientations in actual use. Thus, a feature that is vertical, horizontal, to the right, or to the left in the figures may not have that same orientation or direction in actual use.

Although specific embodiments have been illustrated and described for purposes of illustration, it will be understood that various modifications may be made without departing from the spirit and scope of the disclosure. Accordingly, the invention should not be limited except as by the appended claims.

The invention claimed is:

1. A method of indicating an aiming adjustment in a riflescope of a shooting device, the method comprising:
   receiving, at a controller in the riflescope, a ballistics solution signal, the ballistics solution signal corresponding to a path of a projectile to be fired from the shooting device toward a target;
   receiving, at the controller, a first electronic signal corresponding to a position of an elevation adjustment selector of the riflescope relative to a zero point of the elevation adjustment selector;
   determining, by the controller, a magnitude and a direction of an aiming adjustment based on at least the first electronic signal and the ballistics solution signal; and activating an electronic indicator to provide a notification signal to a user, the notification signal conveying the magnitude and the direction of the aiming adjustment, the activating the electronic indicator comprising activating a visual element in a reticle of the riflescope, the activating the visual element comprising numerically indicating on a vertical crosshair of the reticle a number of clicks of an elevation adjustment dial of the riflescope to implement a vertical component of the aiming adjustment, each click corresponding to a preset amount of rotative displacement of the elevation adjustment dial, the activating the visual element further comprising numerically indicating on a horizontal crosshair of the reticle a number of clicks of a windage adjustment dial of the riflescope to implement a horizontal component of the aiming adjustment, each click corresponding to a preset amount of rotative displacement of the windage adjustment dial, the activating the visual element further comprising pictorially indicating on the horizontal crosshair a rotative direction to turn the windage adjustment dial of the riflescope to implement the horizontal component of the aiming adjustment.

2. The method of claim 1, in which the activating the visual element further comprises pictorially indicating on the vertical crosshair a rotative direction to turn the elevation adjustment dial of the riflescope to implement the vertical component of the aiming adjustment.

3. A method of indicating an aiming adjustment in a riflescope of a shooting device, the method comprising:
   receiving, at a controller in the riflescope, a ballistics solution signal, the ballistics solution signal corresponding to a path of a projectile to be fired from the shooting device toward a target;
   receiving, at the controller, a first electronic signal corresponding to a position of an elevation adjustment selector of the riflescope relative to a zero point of the elevation adjustment selector;
   determining, by the controller, a magnitude and a direction of an aiming adjustment based on at least the first electronic signal and the ballistics solution signal; and
   activating an electronic indicator to provide a notification signal to a user, the notification signal conveying the magnitude and the direction of the aiming adjustment, the activating the electronic indicator comprising activating a visual element in a reticle of the riflescope, the activating the visual element comprising numerically displaying on a vertical crosshair of the reticle an angular correction to implement a vertical component of the aiming adjustment.

4. The method of claim 3, in which activating the visual element further comprises pictorially indicating on the vertical crosshair a rotative direction to turn an elevation adjustment dial of the riflescope to implement the vertical component of the aiming adjustment.

5. A method of indicating an aiming adjustment in a riflescope of a shooting device, the method comprising:
   receiving, at a controller in the riflescope, a ballistics solution signal, the ballistics solution signal corresponding to a path of a projectile to be fired from the shooting device toward a target;
   receiving, at the controller, a first electronic signal corresponding to a position of an elevation adjustment selector of the riflescope relative to a zero point of the elevation adjustment selector;
   determining, by the controller, a magnitude and a direction of an aiming adjustment based on at least the first electronic signal and the ballistics solution signal; and
   activating an electronic indicator to provide a notification signal to a user, the notification signal conveying the magnitude and the direction of the aiming adjustment, the activating the electronic indicator comprising activating a visual element in a reticle of the riflescope, the activating the visual element comprising numerically displaying on the horizontal crosshair of the reticle an angular correction to implement a horizontal component of the aiming adjustment.

6. The method of claim 5, in which activating the visual element further comprises pictorially indicating on the horizontal crosshair a rotative direction to turn a windage adjustment dial of the riflescope to implement the horizontal component of the aiming adjustment.

7. The method of claim 1, further comprising receiving, at the controller, a second electronic signal corresponding to a position of a windage adjustment selector of the riflescope relative to a zero point of the windage adjustment selector, in which determining the magnitude and the direction of the aiming adjustment is based on at least the first electronic signal, the second electronic signal, and the ballistics solution signal.

* * * * *